United States Patent [19]

Tominaga et al.

[11] Patent Number: 4,785,068

[45] Date of Patent: Nov. 15, 1988

[54] RESIN COMPOSITION FOR USE IN ELECTRODEPOSITION PAINTS

[75] Inventors: Akira Tominaga; Reiziro Nishida, both of Hiratsuka, Japan

[73] Assignee: Kansai Paint Co., Ltd., Hyogo, Japan

[21] Appl. No.: 62,832

[22] Filed: Jun. 16, 1987

[30] Foreign Application Priority Data

Jun. 16, 1986 [JP] Japan .................................. 61-138163

[51] Int. Cl.$^4$ ............................................. C08G 18/30
[52] U.S. Cl. ...................................... 528/45; 528/48; 528/59; 528/68
[58] Field of Search .......................... 528/45, 48, 59, 68

[56] References Cited

U.S. PATENT DOCUMENTS 4,182,833  1/1980  Hicks ..................................... 528/120
4,458,056  7/1984  Holubka ................................ 528/45

*Primary Examiner*—John Kight
*Assistant Examiner*—S. A. Acquah
*Attorney, Agent, or Firm*—Wenderoth, Lind & Ponack

[57] ABSTRACT

A resin composition for use in cationic electrodeposition paints, said composition comprising a cationic resin and a blocked polyisocyanate compound as a curing agent component, said blocked polyisocyanate compound containing per molecule one low-temperature dissociating blocked isocyanate group having a blocking agent dissociating temperature of 60° to 120° C. and at least one high-temperature dissociating blocked isocyanate group which dissociates the blocking agent as a temperature higher than said dissociating temperature by at least 40° C.

16 Claims, No Drawings

RESIN COMPOSITION FOR USE IN ELECTRODEPOSITION PAINTS

This invention relates to a resin composition for use in cationic electrodeposition paints which comprises a blocked polyisocyanate compound as a curing agent component. More specifically, it relates to a resin composition for use in cationic electrodeposition paints which has markedly improved edge covering property without a deterioration in the smoothness, physical properties and chemical properties of coated films and in the stability of an electrodeposition bath prepared therefrom.

A typical example of a conventional cationic electrodeposition paint is prepared by reacting an epoxy resin such as bispenol A-epichlorohydrin type epoxy resin with a basic amino compound, and neutralizing a mixture of the resulting cationic resin and an aromatic polyisocyanate compound (curing agent) blocked with an alcohol with a water-soluble acid, and dispersing the resulting neutralization product in water. When the aqueous dispersion is heated to, for example, 170° C. in order to electrodeposit it and cure the coated film, the coated film melt-flows before the curing reaction takes place. Thus, a smooth coated film of a given thickness is formed in a planar part of the substrate. However, the melt-flowing coated film is drawn to the planar part owing to surface tension, and the coated film in the edge part becomes thin and is cured as such. The corrosion resistance of the edge part therefore becomes poor. In order to remedy this defect, a technique has previously been employed by which the flowability of the coated film under heat is reduced by increasing the pigment content, and the edge covering property is increased. This technique however has the defect that pigment settling tends to occur or the smoothness of the entire coated film is reduced.

The present inventors have made extensive investigations on a method of increasing the corrosion resistance of the edge portions without impairing the smoothness of the coated film. These investigations have led to the unexpected discovery that by using as a curing agent a blocked polyisocyanate compound containing one blocked isocyanate group having a dissociation temperature of 80° to 120° C. and at least one blocked isocyanate group having a dissociation temperature at least 40° C. higher than said dissociation temperature per molecule, a thick coated film can be formed on the edge part of a substrate, the corrosion resistance of the edge part is improved, and the smoothness and other various properties of the coated film in the planar part and the stability of an electrodeposition bath comprising a resin composition containing the curing agent component are not deteriorated. This is presumably because as soon as the coated film flows under heat and is smoothened, the isocyanate groups from which the blocking agent has been dissociated at low temperatures react with the cationic resin to thicken the flowing coated film and prevent further flowing of the coated film and its thinning at the edge part; the blocked isocyanate groups having a high dissociation temperature are dissociated at higher temperatures, and the solvent effect of the dissociated blocking agent increases the uniformity of the coated film and finally, a cured coated film having excellent edge covering property and smoothness is obtained.

According to this invention, there is provided a resin composition having excellent edge covering property for use in cationic electrodeposition paints, said composition comprising a cationic resin, and a blocked polyisocyanate compound as a curing agent component, said blocked polyisocyanate compound containing per molecule one low-temperature dissociating blocked isocyanate group having a blocking agent dissociating temperature of 60° to 120° C. and at least one high-temperature dissociating blocked isocyanate group which dissociates the blocking agent at a temperature higher than said dissociating temperature by at least 40° C.

The cationic resin in the resin composition of this invention which is to be cured with the above specific blocked isocyanate compound as a curing agent component may be a known resin of any desired type which has a cationic group and a functional group capable of reacting with the isocyanate (for example, a hydroxyl or amino group), can be coated by cationic electrodeposition, and forms a stable aqueous dispersion.

Examples of the cationic resin that can be used in the invention are shown below.

(i) The reaction product of a polyepoxy resin and a cationizing agent.

(ii) A resin obtained by protonizing with an acid a polycondensate of a polycarboxylic acid and a polyamine (see U.S. Pat. No. 2,450,940).

(iii) A resin obtained by protonizing with an acid, a polyaddition product of a polyisocyanate, a polyol and a mono- or poly-amine.

(iv) A resin obtained by protonizing with an acid a copolymer of a hydroxyl- and amino-containing acrylic or vinyl monomer (see Japanese Patent Publications Nos. 12395/1970 and 12396/1970).

(v) A resin obtained by protonizing with an acid an adduct of a polycarboxylic acid resin and an alkylenimine (see U.S. Pat. No. 3,403,088).

Specific examples of these cationic resins and methods for production thereof are described, for example, in Japanese Patent Publications Nos. 12395/1970, 12396/1970 and 23087/1974, and U.S. Pat. Nos. 2,450,940, 3,403,088, 3,891,529 and 3,963,663.

A reaction product which may have remaining epoxy groups and is obtained by reacting a cationizing agent with the epoxy groups of a polyepoxide compound obtained from a polyphenol compound and an epihalohydrin such as epichlorohydrin is particularly desirable as the cationic resin in this invention in view of its excellent corrosion resistance.

The polyepoxide compound is a compound containing at least two epoxy groups

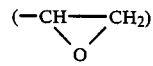

per molecule, and those which generally have a number average molecular weight of at least 200, preferably 400 to 4,000, more preferably 800 to 2,000, are suitable. Known epoxide compounds may be used. Examples include polyglycidyl ethers of polyphenols which can be produced by reacting polyphenols with epichlorohydrin in the presence of alkalies. Examples of the polyphenols include bis(4-hydroxyphenyl)-2,2-propane, 4,4'-dihydroxybenzophenone, bis(4-hydroxyphenyl)-1,1-ethane, bis-(4-hydroxyphenyl)-1,1-isobutane, bis(4-hydroxy-tert-butyl-phenyl)-2,2-propane, bis(2-hydroxynaphthyl)methane, 1,5-dihydroxynaphthalene, bis(2,4- dihydroxyphenyl)methane, tetra(4-hydroxyphenyl)-1,1,2,2-ethane, 4,4'-dihydroxydiphenyl ether, 4,4'-dihydroxydiphenylsulfone, phenol novolac, and cresol novolac.

Among the polyepoxide compounds described above, polyglcidyl ethers of polyphenols having a number average molecular weight of at least about 380, preferably about 800 to 2,000, and an epoxy equivalent of 190 to 2,000, preferably 400 to 1,000, are especially preferred for the production of the cationic resin. Above all, compounds of the following formula are preferred.

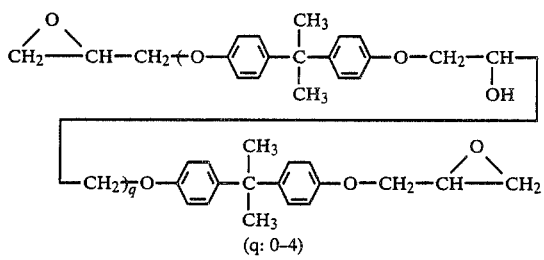

(q: 0–4)

The polyepoxide compounds may be partly reacted with, for example, polyols, polyether polyols, polyester polyols, polyamide amines, polycarboxylic acids and polyisocyanates, or may be grafted-copolymerized with, for example, epsilon-caprolactone or acrylic monomers.

Examples of the cationizing agents to be reacted with the polyepoxide compounds are aliphatic, alicyclic or aromatic-aliphatic primary or secondary amines, tertiary amine salts, secondary sulfide salts and tertiary phosphine salts. They react with the epoxy groups to form cationic groups. The hydroxyl groups of an epoxy resin may be reacted with a tertiary amino monoisocyanate obtained by reacting a tertiary amino alcohol and a diisocyanate, to obtain cationic groups.

Examples of the amino compounds in the cationizing agents above are shown below.

(1) Primary amines such as methylamine, ethylamine, n- or iso-propylamine, monoethanolamine, and n- or iso-propanolamine.

(2) Secondary amines such as diethylamine, diethanolamine, di-n- or iso-propanolamine, N-methylethanolamine and N-ethylethanolamine.

(3) Polyamines such as ethylenediamine, diethylenetriamine, hydroxyethylaminoethylamine, ethylaminoethylamine, methylaminopropylamine, dimethylaminoethylamine and dimethylaminopropylamine.

Among them, alkanolamines having a hydroxyl group are preferred. The primary amino groups may be blocked in advance by reaction with a ketone, and the remaining active hydrogens may be reacted with the epoxy groups.

In addition to the amine compounds shown above, basic compounds such as ammonia, guanidine, hydroxylamine, hydrazine and hydroxyethylhydrazine may equally be used. Basic groups formed by using these compounds may be converted to cationic groups by protonization with acids, preferably water-soluble organic carboxylic acids such as formic acid, acetic acid and lactic acid.

There can also be used tertiary amines such as triethylamine, triethanolamine, N,N-dimethylethanolamine, N-methyldiethanolamine, N,N-diethylethanolamine and N-ethyldiethanolamine. They may be protonized with acids (salt formation) in advance and may be quaternized together with the epoxy groups.

Salts of sulfides such as diethylsulfide, diphenyl sulfide, tetramethylene sulfide and thiodiethanol with boric acid, carbonic acid or organic monocarboxylic acids may be reacted with the epoxy groups to form tertiary sulfonium salts.

Salts of phosphines such as triethylphosphine, phenyldimethylphosphine, diphenylmethylphosphine and triphenylphosphine with the above acids may be reacted with the epoxy groups to form quaternary phosphonium salts.

The hydroxyl group content of the cationic resin used in this invention, in terms of its hydroxyl value, is preferably about 10 to 400 in general, 20 to 200 in particular, in view of reactivity with the polyisocyanate compound. The content of the cationic groups is desirably one sufficient to disperse the cationic resin stably in water, and is preferably 5 to 100, particularly 10 to 50, in terms of the number of KOH (mg/g solids). Even when the content of the cationic groups is less than 5, the cationic resin can be dispersed in water by using a surface-active agent. Desirably, the content of cationic groups is adjusted so that the pH of the aqueous dispersion of the composition has a pH of 4 to 9, preferably 6 to 7.

Now, the blocked polyisocyanate compound (curing agent) used in admixture with the cationic resin will be described.

The polyisocyanate compound used in the production of the curing agent is a compound having at least two isocyanate groups per molecule. Preferred are those having 2 to 3 isocyante groups per molecule and a molecular weight of 150 to 600. Typical examples of the polyisocyanate groups include polyisocyanate compounds having aromatic isocyanate groups in which the isocyanate groups are directly bonded to an aromatic ring (e.g., a benzene ring), such as 2,4- or 2,6-tolylene diisocyanate and 4,4'-diphenylmethane diisocyanate; polyisocyanate compounds having aliphatic isocyanate groups in which the isocyanate groups are directly bonded to an aliphatic group, such as hexamethylene diisocyanate, dimeric acid diisocyanate, 1,4-dicyclohexylmethane diisocyanate, isophorone diisocyanate, m- or p-xylylene diisocyanate and lysine diisocyanate; and di- to tri-mers of these, water adducts of these, and diol or polyol adducts of these. Among these, 2,4- or 2,6-tolylene diisocyanate, 4,4'-diphenylmethane diisocyanate, and an adduct of one of these aromatic diisocyanates and isophorone diisocyanate with a diol or polyol are especially preferred in view of corrosion resistance.

The blocked polyisocyanate compounds are obtained by blocking at least two isocyanate groups of the above polyisocyanate compounds with a blocking agent. When such blocked polyisocyanate compounds are heated at a temperature above a certain point, the blocking agent is dissociated to regenerate the isocyanate groups which then crosslink with the base resin.

The blocked polyisocyanate compounds used in this invention are characterized by the fact that the dissociating temperatures of multiple blocking agents contained for each molecule partly differ from each other. The use of such a blocked polyisocyanate compound can markedly improve the edge covering property.

Specifically, among blocking agents bonded to at least two isocyanate groups per molecule of the blocked polyisocyanate compound used in this invention, one blocking agent is dissociated at a low temperature region of about 80° to 120° C., preferably 90° to 110° C., and the remaining one or more blocking agent, at a temperature higher than the above temperature by at least 40° C., preferably 40° to 60° C. If the dissociation temperature of the blocking agent in the low-temperature region is lower than 80° C., a coated film having a high viscosity is formed before it melt-flows, and its smoothness is reduced. On the other hand, if the dissociating temperature of the blocking agent in the low-temperature region is higher than 120° C., a coated film having a low melt viscosity is formed, and its edge covering property is not sufficient. If the difference between the dissociation temperature in the low temperature region and the dissociation temperature in the higher temperature region is smaller than 40° C., the resulting coated film is liable to have poor smoothness or poor edge covering property, or both.

The blocked polyisocyanate compounds in which the dissociation temperature of at least two blocking agents contained in each molecule differ at least partly can be easily obtained by using blocking agents having different dissociating temperatures (method A), or using a polyisocyanate compound having at least two isocyanate groups having different dissociation temperatures for the same blocking agent (method B).

Method A

At least two isocyanate groups contained per molecule of the polyisocyanate compound are blocked with at least two blocking agents having different dissociating temperatures. In this case, a low-temperature dissociating blocking agent which dissociates at a low temperature of 80° to 120° C., and a high-temperature dissociating blocking agent which dissociates at a temperature at least 40° C. higher than the above temperature in the low temperature region are used; and one of the isocyanate groups in each of the molecules of the polyisocyanate compounds is blocked with the low-tempetature dissociating blocking agent, and the remaining one or more isocyanate groups are blocked with the higher temperature dissociating blocking agent, whereby one isocyanate group blocked with the low-temperature dissociating blocking agent and at least one isocyanate group blocked with the high temperature dissociating blocking agents are present together in one molecule of the blocked polyisocyanate compound.

Examples of the low-temperature dissociating blocking agent which dissociates at 80° to 120° C. include tertiary hydroxylamines such as diethylethanolamine and dimethylethanolamine, oximes such as methylethyl ketoxime, acetoneoxime and cyclohexanone oxime, phenols such as phenol, nonylphenol and bis(4-hydroxyphenyl)-2,2-propane; lactams such as epsilon caprolactam, and active methylene compounds such as acetylacetone and diethyl malonate. Oximes are particularly suitable for blocking aromatic isocyanate groups. Oximes and phenols are preferred for blocking aliphatic isocyanate groups.

Examples of the high-temperature dissociating blocking agent include alcohols, for example alkanols such as ethanol, n- or iso-propanol, n-, iso-, sec- or tert-butanol and 2-ethylhexanol, alkyl ether alcohols such as ethylene glycol monomethyl ether, ethylene glycolmonoethyl ether, ethylene glycol monoisopropyl ether, ethylene glycol monobutyl ether, diethylene glycol monomethyl ether, diethylene glycol monoethyl ether, diethylene glycol monoisopropyl ether, diethylene glycol monobutyl ether, propylene glycol monomethyl ether, propylene glycol monoethyl ether, propylene glycol monopropyl ether and propylene glycol monobutyl ether, alicyclic alcohols such as cyclohexyl alcohol, and aromatic-aliphatic alcohols such as benzyl alcohol. Of these, alkyl ether alcohols are especially suitable. Among the compounds exemplified above as the low-temperature dissociating blocking agent, oximes, lactams and active methylene compounds which dissociate at relatively high temperatures may also be used to block the aliphatic isocyanate groups.

According to method A, the blocked polyisocyanate compound can be produced by reacting one isocyanate group in each molecule of the polyisocyanate compound with a stoichiometrically equivalent weight of at least one blocking agent selected from the low-temperature dissociating blocking agents, and reacting the remaining isocyanate groups with a stoichiometrically equivalent weight of the high-temperature dissociating blocking agent such as an alcohol. The above reactions may be reversed in sequence.

Preferably, at least one blocking agent is selected from each of the group of the low-temperature dissociating blocking agents and the group of the high-temperature dissociating blocking agents. If at least two blocking agents selected from low-temperature dissociating blocking agents have a difference in dissociating temperature of at least 40° C., a polyisocyanate compound blocked only with these blocking agents may also be used in this invention.

Method B

This method uses a polyisocyanate compound containing per molecule at least two isocyanate groups having different dissociation temperatures for the same blocking agent. Examples of such a polyisocyanate compound are compounds obtained by combining polyisocyanate compounds having aromatic isocyanate groups which have the property of dissociating blocking agents at relatively low temperatures, such as tolylene diisocyanate and 4,4'-diphenylmethane diisocyanate with polyisocyanate compounds having aliphatic diisocyanate groups having the property of dissociating blocking agents at relatively high temperatures, such as hexamethylene diisocyanate, isophorone diisocyanate and xylyene diisocyanate, via water or a polyol such as glycerol, trimethylolpropane, ethylene glycol, 1,2-propylene glycol and 1,2-butylene glycol (above all, polyisocyanate compounds obtained by combining 2,4-tolylene diisocyanate and isophorone diisocyanates having isocyanate groups with different reactivities in each molecule via 1,2-propylene glycol, 1,3-butylene glycol or 1,2-butylene glycol having at least two hydroxyl groups with different reactivities in each molecule), and blocking the isocyanate groups of the resulting isocyanate compounds with at least one blocking agent selected from oximes, lactams, active methylene compounds, etc. These blocked polyisocyanate compounds dissociate the blocking agents in the above-specified different temperature regions. In this case, the reaction of the polyisocyanate compound with the polyol may be carried out after the polyisocyanate compound is partially blocked with the blocking agent.

In methods A and B described above, the individual reactions for producing the blocked polyisocyanate compounds may be carried out at relatively low temperatures of from room temperature to about 150° C. by using an inert solvent, a catalyst, etc. as required in accordance with known methods.

The curing agent so produced has a molecular weight of usually 200 to 2,000, preferably 300 to 1,000.

The amount of the curing agent to be mixed with the cationic resin may be varied depending upon the type of the cationic resin within a range from a minimum amount sufficient for the resulting coated film to self-cure or be cured under heat to a maximum amount which does not impair the stability of the final aqueous dispersion paint. Generally, the amount of the curing agent is preferably such that the equivalent of the blocked isocyanate groups in the curing agent is equal to, or larger than, the equivalent of the cationic groups in the cationic resin and is equal to, or smaller than, the total equivalent of functional groups containing active hydrogen.

Part of the curing agent of this invention may be replaced by a conventional blocked polyisocyanate.

The resin composition of this invention for use in cationic electrodeposition paints may be prepared by mixing the cationic resin with the curing agent (protonization of the cationic resin may be carried out after this mixing), dispersing the mixture stably in water, and as required, kneading the dispersion with a colored pigment such as carbon black, titanium white or red iron oxide, an extender pigment such as clay and talc, an anticorrosive pigment such as strontium chromate and lead chromate, or other additives. Examples of the other additives are dispersion aids (nonionic surfactants), crater preventing agents (e.g., acrylic resins, fluorine resins, and silicone resins), and curing accelerators (e.g., salts of metals such as lead, bismuth and tin).

An electrodeposition bath may be prepared from the resin composition of this invention in accordance with a known method, and cationically electrodeposited on a suitable electrically conductive substrate. For example, the resin composition of this invention is adjusted with deionized water to a solids content of about 5 to about 40% by weight, and its pH is adjusted to 5.5 to 8.0.

The electrodeposition paint thus prepared is coated usually at a bath temperature of 15° to 35° C. and an applied voltage of 100 to 400 V on a metallic substrate as a cathode.

The thickness of the electrodeposited film is not particularly restricted and can be varied widely depending upon the end use of the coated product, etc. Preferably, the thickness of the electrodeposited film formed in a planar part of the substrate is generally 10 to 40 microns, especially 15 to 35 microns, in the cured state. The suitable baking and curing temperature for the coated film is generally 80° to 220° C., preferably 140° to 180° C.

The following examples illustrate the present invention more specifically. In these examples, all parts and percentages are by weight.

The edge covering property of the electrodepositing composition obtained in these examples was measured by the following method.

Method of testing edge covering property

A zinc phosphate-treated blade OLFA cutter (OLFA LB-10; length 10 cm; width 1.8 cm; angle of blade edge 22°; a product of OLFA Co., Ltd.) was coated by electrodeposition, and then subjected to a salt spray test in accordance with JIS Z-2871. The coated film on the blade was observed under a magnifying glass and the number of rusts and blisters was measured. The edge covering property was evaluated by this number.

EXAMPLE 1

174 Parts of 2,4-tolylene diisocyanate was dissolved in 78 parts of methyl isobutyl ketone, and 87 parts of methyl ethyl ketoxime was added dropwise at 25° to 35° C. The reaction product after the addition had an isocyanate value of 161. Further, 130 parts of 2-ethylhexyl alcohol was added dropwise. After the addition, the mixture was heated to 100° C. and maintained for 4 hours, whereupon the isocyanuate value of the product became 0. As a result, a curing agent having a solids content of 83% was obtained which had two different blocked isocyanate groups having blocking agent dissociating temperatrures in the presence of a catalyst of about 100° C. and about 160° C.

1900 Parts of bisphenol A-type epoxy resin having an epoxy equivalent of 950 (tradename "Epikote 1004", a product of Shell Chemical Co.) was dissolved in 1012 parts of butyl Cellosolve, and 124 parts of diethylamine was added dropwise at 80° to 100° C. The mixture was maintained at 120° C. for 2 hours to give an epoxy resin-amine adduct having an amine value of 47.

Then, 1000 parts of a dimeric acid-type polyamide resin having an amine value of 100 (tradename Versamide 460 made by Henkel Hakusui Co., Ltd.) was dissolved in 429 parts of methyl isobutyl ketone. The solution was refluxed at 130° to 150° C., and water generated was evaporated to ketiminize the terminal amino groups of the amide resin. The product was maintained at 150° C. for about 3 hours, and after evaporation of water ceased, cooled to 60° C. The product was added to the epoxy resin-amine adduct obtained as above. The mixture was heated to 100° C., maintained for 1 hour at this temperature, and cooled to room temperature to give an epoxy resin/amine/polyamide adduct resin having a solids content of 68% and an amine value of 65. Acetic acid (1.5 parts) was added to 100 parts of the resulting resin to neutralize it and thus obtain a cationic resin.

The above curing agent (23 parts) and 3 parts of dibutyltin dilaurate were added to 101.5 parts of the cationic resin. With sufficient stirring, 307 parts of deionized water was added to prepare an electrodeposition bath having a solids content of about 20% and a pH of 6.8.

Electrodeposition was carried out from the resulting electrodeposition bath on a zinc phosphate-treated steel plate as a cathode at 30° C. and 200 V for 3 minutes. The resulting coated film was baked at 180° for 30 minutes to obtain a coated film having a thickness of 23 microns and a pencil hardness of 5H. The surface of the coated film had excellent smoothness and was lustrous. Its edge covering property was very good (the number of rusts and blisters was 3).

EXAMPLE 2

174 Parts of 2,4-tolylene diisocyanate was dissolved in 52 parts of methyl isobutyl ketone, and 87 parts of methyl ethyl ketoxime was added dropwise at 30° C. to give half-blocked tolylene diisocyanate having an isocyanate value of 241 and a solids content of 83%.

Then, 222 parts of isophorone diisocyanate was dissolved in 62 parts of methyl isobutyl ketone, and 87 parts of methyl ethyl ketoxime was added dropwise at 30° C. to obtain half-blocked isophorone diisocyanate having an isocyanate value of 136. 76 Parts of 1,2-propylene glycol was added to it, and the mixture was heated to 120° C. and maintained for 4 hours. After its isocyanate value reached 0, 313 parts of the half-blocked tolylene diisocyanate was added. The mixure was maintained at 120° C. for 5 hours, and it was determined that its isocyanate value reached 0. As a result, a curing agent having a solids content of 85% was obtained in which the blocking agents had a dissociation temperature in the presence of a catalsyt of about 100° C. and about 140° C.

The resulting curing agent (18 parts) and 3 parts of dibutyltin dilaurate were added to 101.5 parts of the same cationic resin as used in Example 1. With sufficient stirring, 294 parts of deionized water was added to prepare an electrodeposition bath having a solids content of about 20% and a pH of 6.7. Electrode-position was carried out from the electrodeposition bath at 30° C. and 200 V for 3 minutes. The resulting coated film was baked at 180° C. for 30 minutes to give a coated film having a thickness of 22 microns and a pencil hardness of 5H. The surface smoothness of the coated film was fairly good, and its edge covering property was very good (the number of rusts and blisters was 4).

COMPARATIVE EXAMPLE 1

174 Parts of 2,4-/2,6-tolylene diisocyanate (80/20 wt. %) was dissolved in 87 parts of methyl isobutyl ketone, and 260 parts of 2-ethylhexyl alcohol was added at 30° C. The mixture was then maintained at 120° C. for 5 hours. It was determined that the isocyanate value of the product was 0. As a result, a curing agent having a blocking agent dissociation temperature in the presence of a catalyst of about 160° C. was obtained.

The resulting curing agent (26 parts) and 3 parts of dibutyltin dilaurate were added to 101.5 parts of the cationic resin obtained in Example 1. With sufficient stirring, 317 parts of deionized water was added to prepare an electrodeposition bath having a solids content of about 20% and a pH of 6.7.

Elecrodeposition was carried out from the electrode-position bath on a zinc phosphate-treated steel sheet as a cathode at 30° C. and 200 V for 3 minutes. The resulting coated film was baked at 180° C. for 30 minutes to give a coated film having a thickness of 21 microns and a pencil hardnesss of 5H. The surface smoothness of the coated film was good, but its edge covering property was very poor (the number of rusts and blisters was 45).

EXAMPLE 3

85 Parts of polycaprolactone diol having a hydroxyl equivalent of 425 was added to 174 parts of 2,6-tolylene diisocyanate, and 174 parts of 2-ethylhexyl Cellosolve was added dropwise at 40° C. . The reaction was carried out at this temperature until the isocyanate value of the diisocyanate decreased to 97. Methyl ethyl ketoxime (87 parts) was added dropwise at 50° C. and reacted until the isocyanate value of the product became 0. The blocking agents in the resulting blocked polyisocyanate compound (curing agent) had dissociation temperatures of 100° C. and 150° C.

Separately, 1260 parts of bisphenol A-type epoxy resin ("Epikote 1002", a tradename for a product of Shell Chemical Co.) having an epoxy equivalent of 650 was dissolved in 450 parts of butyl Cellosolve, and 132 parts of p-nonylphenol and 105 parts of N-methylethanolamine were added. The mixture was heated to 140° C., and reacted at this temperature until the viscosity of the reaction mixture ceased to rise. As a result, an amine-added epoxy resin haivng a solids content of 77% and an amine value of 52 was obtained. Acetic acid (2.1 parts) was added to 130 parts of this resin to protonize it and thus obtain a cationic resin in accordance with this invention.

Then, 30 parts of the curing agent, 1.3 parts of lead acetate and 1.3 parts of polypropylene glycol having an average molecular weight of 4,000 were added to the cationic resin, and deionized water was gradually added to form an emulsion having a solids content of 30%. A pigment paste composed of an aqueous solution of 15 parts of titanium white, 7 parts of clay, 0.3 part of carbon black, 3 parts of dioctyltin oxide and 4 parts of a quaternary ammonium salt resin obtained by reacting dimethylaminoethanol/lactic acid with Epikote 1004 in equivalent weights was added to the emulsion, and the mixture was diluted with deionized water to a solids content of 19% to prepare an electrodeposition bath. Electrodeposition was carried out at a bath temperature of 28° C. and an applied voltage of 250 V for 3 minutes, and the coated film was baked at 170° C. for 30 minutes to prepare a test panel for evaluating edge covering property. The coated film had good smoothness and excellent edge covering property (the number of rusts and blisters was 5).

COMPARATIVE EXAMPLE 2

174 Parts of a mixture of 2,4-/2,6-tolylene diisocyanates (80/20% by weight) was dissolved in 174 parts of butyl acetate, and 174 parts of methyl ethyl ketoxime was added dropwise at 30° to 40° C. After the addition, the mixture was heated to 60° C. to decrease the isocyanate value to 0. The resulting curing agent (37.5 parts) was mixed with 130 parts of the same cationic resin as used in Example 3, and electrodeposition bath as prepared in accordance with the same formulation as in Example 3. Electrodeposition was carried out from the electrodeposition bath as in Example 3, and the coated film was baked at 150 ° C. for 30 minutes to prepare a test panel for evaluating edge covering property. The coated film had very good edge covering property (the number of rusts and blisters was 1) but very inferior surface smoothness, and showed a non-lustrous rough appearance.

What we claim is:

1. A resin composition for use in cationic electrodeposition paints, said composition comprising a cationic resin and a blocked polyisocyanate compound as a curing agent component, said blocked polyisocyanate compound containing per molecule one low-temperature dissociating blocked isocyanate group having a blocking agent dissociating temperature of 60° to 120° C. and at least one high-temperature dissociating blocked isocyanate group which dissociates the blocking agent at a temperature higher than said dissociating temperature by at least 40° C.

2. The composition of claim 1 wherein the blocking agent in the low-temperature dissociating blocked isocyanate group has a dissociation temperature of 90° to 110° C.

3. The composition of claim 1 wherein the dissociation temperature of the high-temperature dissociating blocked isocyanate group is 40° to 60° C. higher than the dissociating temperature of the low-temperature dissociating blocked isocyanate group.

4. The composition of claim 1 wherein the blocked polyisocyanate compound is a polyisocyanate compound in which at least two isocyanate groups present therein are individually blocked with at least two blocking agents having different dissociating temperatures.

5. The composition of claim 4 wherein that blocking agent among said blocking gents which has a lower dissociation temperature is selected from tertiary hydroxylamines, oximes, phenols and lactams.

6. The composition of claim 5 wherein the low-temperature blocked isocyanate group is a blocked aromatic isocyanate group, and the blocking agent is an oxime.

7. The composition of claim 5 wherein the low-temperature blocked isocyanate group is a blocked aliphatic isocyanate group, and the blocking agent is selected from oximes and phenols.

8. The composition of claim 4 wherein the blocking agent having a higher dissociating temperature is selected from alkanols, alkyl ether alcohols, alicyclic alcohols and aroamtic-aliphatic alcohols.

9. The composition of claim 8 wherein the high-temperature blocking agent is an alkyl ether alcohol.

10. The composition of claim 1 wherein the blocked polyisocyanate compound is a blocked polyisocyanate compound containing at least two isocyanate groups having different dissociating temperatures for the same blocking agent.

11. The composition of claim 10 wherein said blocked polyisocyanate compound is a compound resulting from combination of a polyisocyanate compound containing aromatic isocyanate group with a polyisocyanate compound containing aliphatic isocyanate groups through water or a polyol.

12. The composition of claim 1 wherein the blocked polyisocyante compound has a molecular weight of 200 to 2,000.

13. The composition of claim 1 wherein the cationic resin is a resin obtained by reacting a cationizing agent with the epoxy groups of a polyepoxide compound prepared from a polyphenol compound and an epihalohydrin.

14. The composition of claim 13 wherein the polyepoxide compound is a polyglycidyl ether of a polyphenol which has an average molecular weight of at least about 380 and an epoxy equivalent of 190 to 2,000.

15. The composition of claim 1 wherein the cationic resin has a hydroxyl value of about 10 to 400.

16. An electrodeposition coating bath comprising the resin composition of claim 1.

* * * * *